(12) United States Patent
Reichhart

(10) Patent No.: US 8,079,582 B2
(45) Date of Patent: Dec. 20, 2011

(54) METHOD FOR ARRANGING PAGES OF A PRINT PRODUCT ON FOLDED SHEETS AND A METHOD FOR REPRESENTING THE PRODUCTION OF A PRINT PRODUCT

(75) Inventor: Dieter Reichhart, Eschweiler (DE)

(73) Assignee: Hiflex Software GesmbH, Vienna (AT)

( * ) Notice: Subject to any disclaimer, the term of this patent is extended or adjusted under 35 U.S.C. 154(b) by 0 days.

(21) Appl. No.: 12/065,050

(22) PCT Filed: Jul. 28, 2006

(86) PCT No.: PCT/EP2006/007523
§ 371 (c)(1),
(2), (4) Date: Feb. 27, 2008

(87) PCT Pub. No.: WO2007/025617
PCT Pub. Date: Mar. 8, 2007

(65) Prior Publication Data
US 2008/0237963 A1 Oct. 2, 2008

(30) Foreign Application Priority Data
Aug. 30, 2005 (DE) .......... 10 2005 041 164

(51) Int. Cl.
*B42B 2/00* (2006.01)
*B41F 13/58* (2006.01)
*B41F 13/64* (2006.01)
*B41F 13/56* (2006.01)

(52) U.S. Cl. .......... 270/5.02; 270/5.03; 270/11; 270/12; 270/21.1; 270/52.09; 270/52.17

(58) Field of Classification Search .................. 270/5.02, 270/5.03, 11, 12, 21.1, 52.09, 52.17
See application file for complete search history.

(56) References Cited

U.S. PATENT DOCUMENTS
7,016,068 B1 * 3/2006 Gnocato et al. .............. 358/1.18
(Continued)

OTHER PUBLICATIONS
Christian Anschutz, "The Need for a Automated Workflow in the Graphic Arts Industry", Jun. 30, 2001, Digital Smart Factory, pp. 4-5.*
(Continued)

*Primary Examiner* — Gene Crawford
*Assistant Examiner* — Yolanda Cumbess
(74) *Attorney, Agent, or Firm* — Von Rohrscheidt Patents

(57) ABSTRACT

A method for arranging pages of a print product on fold sheets that are subsequently combined into an imposition scheme on print sheets and for representing the production process and the product it produces is disclosed. The print sheets are initially imprinted with the pages and then cut into the fold sheets. The fold sheets are folded and cut and collated into the print products. To make the determination of the imposition schemes more flexible, the pages are initially assigned to partitions of the print products. Pages of a print product that are included in a partition are either not separated from each other, or are only separated from each other by a last cut of the print product. The partitions are disposed on the fold sheets wherein the partitions are hierarchically subordinated to product components and superordinated to the pages, so that pages of a print product that are included in the partitions are either not separated from one another, or are only separated from one another by a last cut of the print product during the production process.

16 Claims, 7 Drawing Sheets

U.S. PATENT DOCUMENTS

Figure 1A:
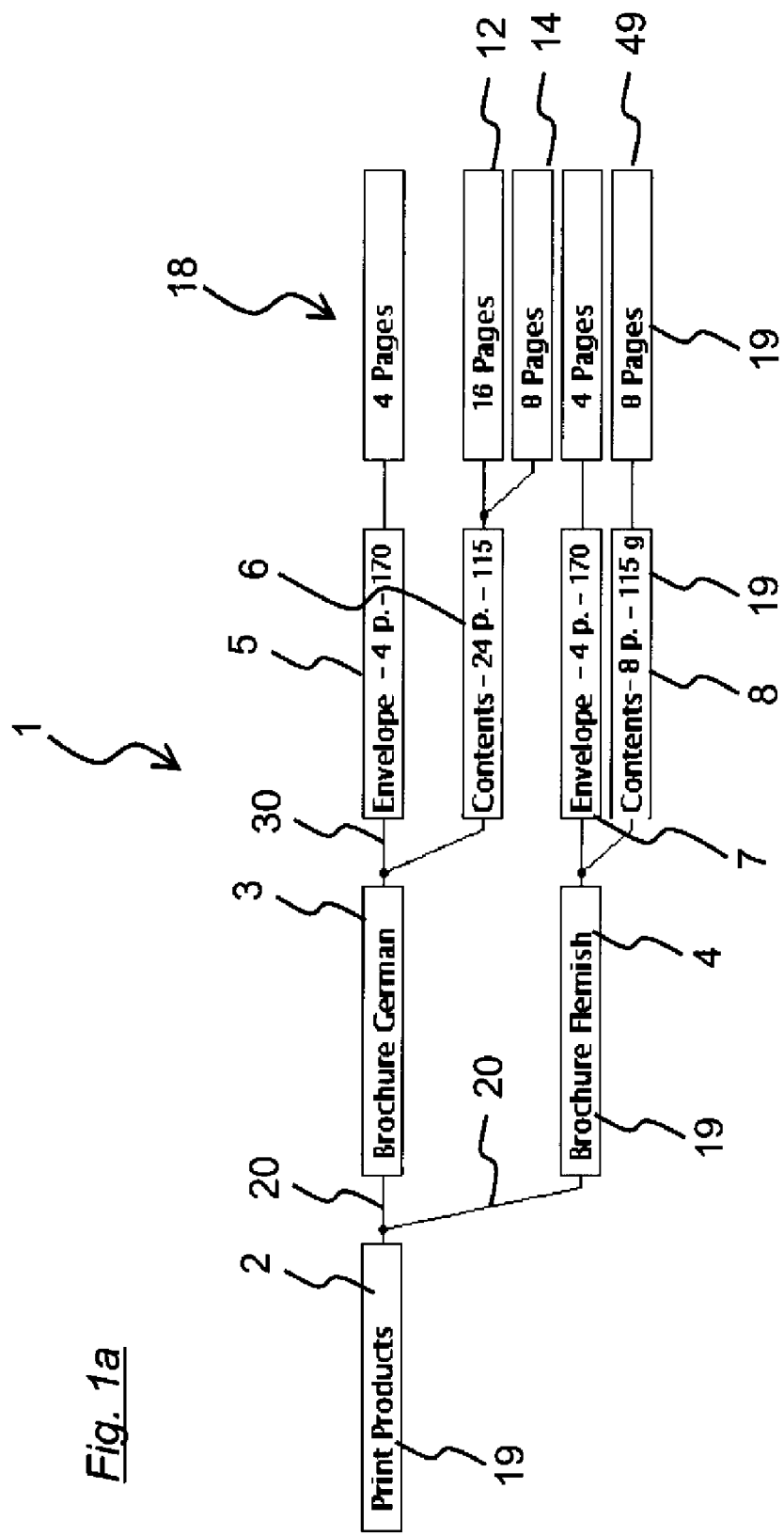

| | | | |
|---|---|---|---|
| 7,333,246 B1 * | 2/2008 | Kowalski et al. | 358/452 |
| 7,349,121 B2 * | 3/2008 | Dechamps | 358/1.5 |
| 2003/0128392 A1 * | 7/2003 | O'Brien et al. | 358/1.18 |
| 2004/0218217 A1 * | 11/2004 | Dechamps | 358/1.18 |

OTHER PUBLICATIONS

CIP4 Org, "JDF Specification Rel. 1.2", May 9, 2004, www.cip4.org, located at http://www.cip4.org/documents/jdf_specifications/JDF1.2.pdf, Chapter 4.4, pp. 118-125.*

Anonymous: "Euprima Drehbuch zum prozessorientierten Datenaustausch mit Management-Information-Systems unter dem Blickwinkel der vollvernetzten Druckerei, attachment 2", anonymous, retrieved from the internet on Jan. 25, 2007.

Anonymous: "JDF Specification Rel. 1.2", pp. 118-125, retrieved from the internet on May 9, 2004.

Anschütz et al.: "The need of a fully automated workflow in the graphic arts industry", in: Digital Smart Factory, Jun. 30, 2001.

* cited by examiner

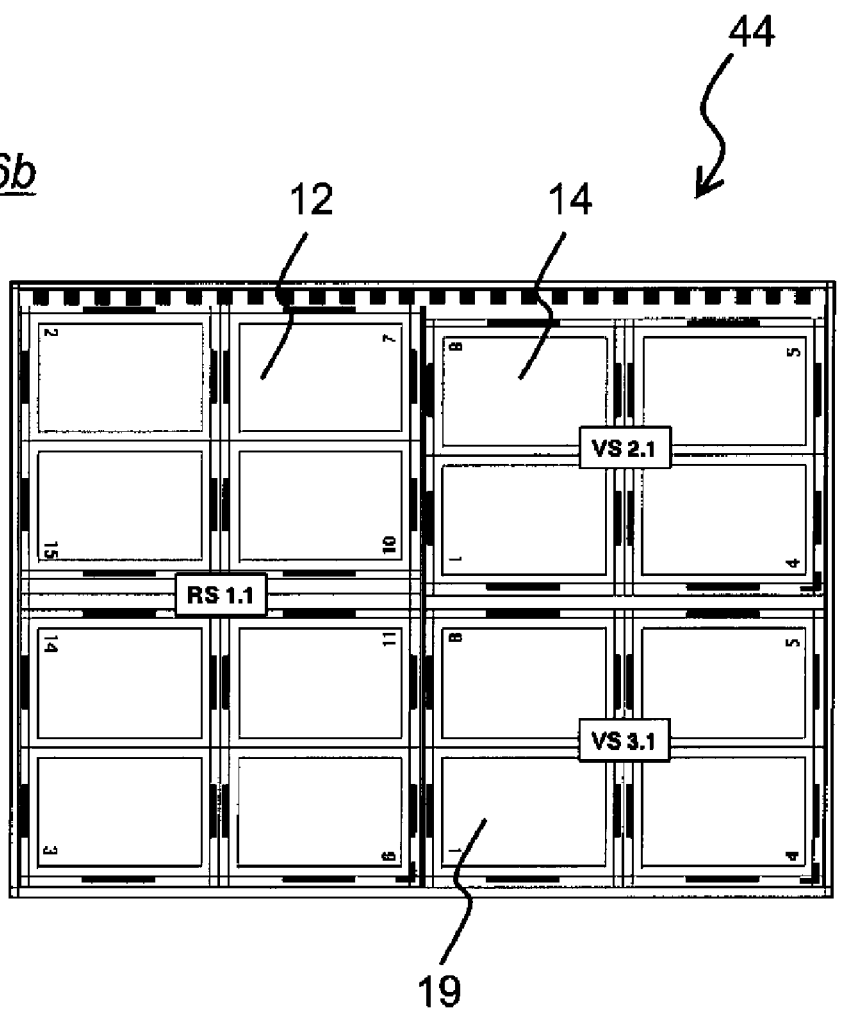

METHOD FOR ARRANGING PAGES OF A PRINT PRODUCT ON FOLDED SHEETS AND A METHOD FOR REPRESENTING THE PRODUCTION OF A PRINT PRODUCT

BACKGROUND OF THE INVENTION

The invention initially relates to a method for arranging pages of a print product on folded sheets, which are subsequently combined into an imposition scheme on print sheets, wherein the print sheets for producing the print product are initially imprinted with the pages and then cut into the fold sheets, thereafter the fold sheets are folded and cut and collated into the print products.

For producing a multipage print product by generally known print methods, e.g. in offset-, letterpress-, gravure-, flexo-, or digital print, several pages are printed together on a large print sheet. For example, a 16-page magazine in DIN-A4 size can be printed on a single print sheet in the standard 63×88 cm size (double-sided).

The genus "sheet" designates the flat paper ware in various embodiments in the context of the production of a print product. A "raw sheet" from the paper storage is cut to a "print sheet" size, which can be processed by the print press. The print sheet can be cut into "partial sheets" thereafter in the process. Print-or partial sheets are folded (or creased) as "fold sheets" in the folding machine, possibly collated into a "raw block", which is eventually bound in .a collation folder or in a gluing folder at one edge and "block" cut at the other edges. Through the variations of this base principle, the known plurality of bound print products is created. For example, the block for producing a magazine can be provided with a wrapper made of a heavier paper, which is imprinted in a more complex manner. For producing a book, several raw blocks are bound at a common back by thread binding.

A fold sheet is folded by cross folding or parallel folding. In case of cross folding, each additional fold of the sheet is performed transversal to the preceding fold, in parallel folding it is performed parallel to the preceding fold. In zigzag or leporello folds, the folds are performed in parallel and in alternating direction, in a roll fold the fold lines are in parallel and the paper is wound up. A combination of cross fold and parallel fold is designated as mixed fold. When folding, the running direction of the paper, in particular the paper weight needs to be considered. A four-line fold for book binding is generally used up to 80 g, a three-line fold is used up to 150 g, a two-line fold is used up to 200 g, and a single line fold is up to a paper weight of 500 g.

This folding and/or creasing divides each sheet into fields that are organized into rows and columns. The pages of the print product have to be organized in these fields so that they appear in the print product in the desired sequence and in the correct orientation. The arrangement of the pages on the sheets required for a print product can be changed, e.g., by including special sheets in the raw block, for example cardboard sheets with postcards that can be cut out by the reader, as is well-known in the art, also sheets made of transparent paper that are used for multilayer graphics, or sheets with single, foil covered, or lacquered pages, or pages that are otherwise specially treated. The activity of arranging the pages of a print product is referred to as "imposing", and the arrangement of the pages on print sheets is referred to as an "imposition scheme".

Print sheets and their imposition schemes are construed by well known, highly specialized CAD (computer aided design) systems. Compared to a manual layout, such systems have a plurality of advantages. By linking dimensions, CAD systems on the one hand, offer an automatic plausibility control, on the other hand, linked dimensions, e.g. the width of a cutoff portion, the position and size of a marker, can be automatically adjusted, when a dimension changes, e.g. a page size. In particular, imposition schemes can be archived with little complexity and are thus available as a basis for subsequent similar applications.

Generally known methods for disposing pages of a print product on fold sheets revert to such an archive of possible imposition schemes. A new order to produce a print product is reduced according to the known method as far as possible to one or several known imposing schemes. The disposition of the pages of the print product on folded sheets is not separated according to the known method from the arrangement of the fold sheets on the print sheet. The known methods are the more flexible, the larger the underlying archive of the possible imposing schemes.

The invention provides a method for representing production of a print product in the context of networked graphic production. The production of the print product is represented in a dendritic structure starting from an order for producing the print product, over the print product and the product components of the print product down to pages of the print product.

Such a method is known from "the script for process oriented data exchange with management information systems under the aspect of a fully networked print shop". This paper refers to the version 1.1, which is current at the moment of filing this application of the "European Print Management System Association" ("EUPRIMA", www.euprima.orq), an association of leading innovative vendors of MIS. It is suggested therein according to the philosophy of the consortium "International Corporation for the Integration of Processes in Prepress, Press, and Post press" ("CIP4-Consortium", www.cip4.org) and the concept based thereon of the job definition format ("JDF"), to make their data structures also the basis of the layout of print sheet, and to define production processes within the data structures of the partial products of a job, in particular with reference to the print sheet associated with a job.

JDF and the "job messaging format" ("JMF", a subgroup of JDF), are generally known data formats developed and maintained by the CIP4-Consortium. The development of JDF is based on the objective to standardize the communication between print shop, designer, advertising agency, and customer for printed matters and subcontractors of contractors in the context of a networked graphic production for all production variants and eventualities in a flexible manner without restrictions.

JDF is based on the extensible markup language ("XML"), also a generally known Meta language, which was developed by the "World Wide Web Consortium" ("W3C", www.w3.org) for defining document types and according to the intention of the CIP4-consortium is to serve as a standard data format for describing processes and products, not only in all production areas of a networked print shop, in particular in sales, job costing, and order processing, production planning and control in the production itself, in prepress, press, print post processing, and shipping, in the cross sectional areas of materials and warehouse management, financial and payroll accounting, controlling cost accounting and quality assurance. By means of the vertical integration of data on the one hand of the production process, and on the other hand of the business sectors JDF is intended to facilitate a high transparency of all production processes, a standardized documentation of relevant target- and actual data and a seamless production control in a uniform, understandable, and continuous data structure.

In a JDF data structure used in processing a lob, each particular process for producing a print product is represented by a "node". The nodes are linked together in a tree structure, which is intended to completely describe the print product and also the process for that product's manufacture. The process nodes are defined by their inputs and outputs. The inputs to nodes are the resources used by the node and the parameters required for their use. A resource that is output by a process node becomes an input to subsequent process nodes. In the XML-based hierarchically branching tree structure of JDF, each process node only has those resources that are described in a superimposed node. However, access to a resource that is output by a node in a parallel "branch" of the tree structure is performed by a generally accessible data structure. Thus, in these other, more generally accessible data structures, resources from two nodes are accessible by the respective two nodes.

Since the print- and fold sheets can be considered as partial structure of a print product according to the known method, they can also not be combined in another manner according to the possibilities provided in the manufacturing process. For example, parts (particular fold sheets or product components) of different jobs cannot be jointly printed on a fold sheet.

The present invention provides a more flexible way of arranging pages on fold sheets and for representing a job that supports this more flexible arrangement of pages on fold sheets.

SUMMARY OF THE INVENTION

Based on the known imposition methods, it is proposed according to the invention that partitions the pages are initially assigned to partitions of the print products, wherein pages of the print product included in a partition are either not separated from each other, or only separated from each other through the last cut of the print product and the partitions are arranged on the fold sheets.

Different from the method based on the JDF data structures suggested by EUPRIMA, pages are managed according to the invention for the print sheet layout, not based on their property as a physical component of a print sheet, which in turn is associated with a job. Instead partitions, superimposed to the pages, are determined as the smallest units, initially based on the manufacturing process, and used for the layout of the fold sheets, and based thereon used for the layout of the print sheets.

This view oriented towards the manufacturing process, the "division" according to the above definition, is the quasi indivisible "atom" of the print product with reference to the production and with reference to a data and process structure based thereon, and allows for the first time the automatic disposition of the pages on fold sheets and thus eventually a complete automation of the print sheet layout independent from extensive catalogs for possible print sheets for almost any print products.

In a particularly preferred manner, a cost optimized disposition is selected based on a method according to the invention from various possible arrangements of the partitions on fold sheets and of the fold sheets on print sheets. The cost optimization can be performed on the one hand for determining an optimum arrangement based on individually prefabricated decision tables and on the other hand based on a comparative consideration of several "calculated" proposals. The cost optimization can be performed in particular in the context of a so-called "production optimization", which comprises an elimination of process steps, which reaches as far as possible, which are considered particularly error prone, based on experience, or based on statistic evaluation of previous work, or based on the preferential execution of process steps which are considered particularly error free.

In particular in the context of a cost optimization preferably an arrangement is selected, so that the waste is minimized and/or predetermined quality requirements are achieved. The optimization with respect to the paper use considers the fact that in more comprehensive print jobs the paper cost is the substantially largest cost factor, and a reduction of the paper cost means almost directly a reduction of the total cost, or a profit increase. The quality requirements for a print product can restrict the number or the type of the folds in particular. For example, in cross fold through the stronger displacement of the innermost position of the fold relative to the outmost position of the fold more or less recognizable "crush folds" are created, which are rather tolerated in a train schedule, than in an annual report of a corporation.

In an advantageous manner, the possible arrangements of the partitions on fold sheets and of the fold sheets on print sheets are determined by a plurality of sheet sizes in the context of a method according to the invention. An optimization in consideration of all sheet sizes available in the warehouse, or processible with the available machines allows the useful application of the method according to the invention, also in the context of large print shops with several different production lines.

A method according to the invention can furthermore provide the option to arrange partitions on fold sheets and fold sheets on print sheets independently from being associated with the print product, in order to produce a plurality of print products. Besides producing various, e.g. language, or country specific, variants, the paper raw material can thus be used more efficiently in particular in specialized print shops, which frequently produce similar print products with reference to paper types, number of colors and print volume.

According to another embodiment of the invention, partitions are represented that are hierarchically subordinated to product components and superordinated to the pages using a known representation method. However, in accordance with the invention, the pages of the print product that are included in a partition are separated from each other either not at all, or only by a last cutting of the print product in the production process, in accordance with the invention.

A representation showing the production of a print product using a data structure arranged in accordance with the invention facilitates performing the method described above. In particular, the representation facilitates automated arrangement of the pages of a print product on fold sheets, and the calculation of an imposition scheme using the calculation module of the MIS.

Preferably, in a representation of print product production in accordance with the invention, print sheets, partial sheets cut out of the print sheets, and/or fold sheets comprised of the print sheets or partial sheets, and print products collated from the partial sheets, and/or the print sheets, are represented in a cross-linked network. This cross-linked structure is contrary to the principle of the JDF system, which uses an XML-type sequential tree structure. Representation of the job according to the invention allows the process-oriented view of the executing print shops to be visualized, which is an important MIS central control element in the manufacturing process, instead of lust the customer's purely product-oriented view of the print product.

In a graphic depiction of a job according to the invention, the partitions are preferably linked in the product structure with the print sheets. In the customer oriented view of the product structure, and also in the production oriented view of the process, the partitions constitute purely virtual variables. For the customer, the manufacture of a product component in several partitions is not visible anymore in the completed product. In production the partitions actually appear as defined separate objects at one point in time (typically at the input of the folder or binder), however they do not appear like in the depiction as an "input variable" of the print sheets. Still, the term "partition", whose actual meaning is easily understandable for the customer, and also from a manufacturing point of view, and its depiction at the interface between the illustrations of the product structure and the process, facilitates an illustration of the contexts in a complex networked graphic production, which is intuitively particularly well understandable.

DETAILED DESCRIPTION OF A PREFERRED EMBODIMENT

Figure 1B:
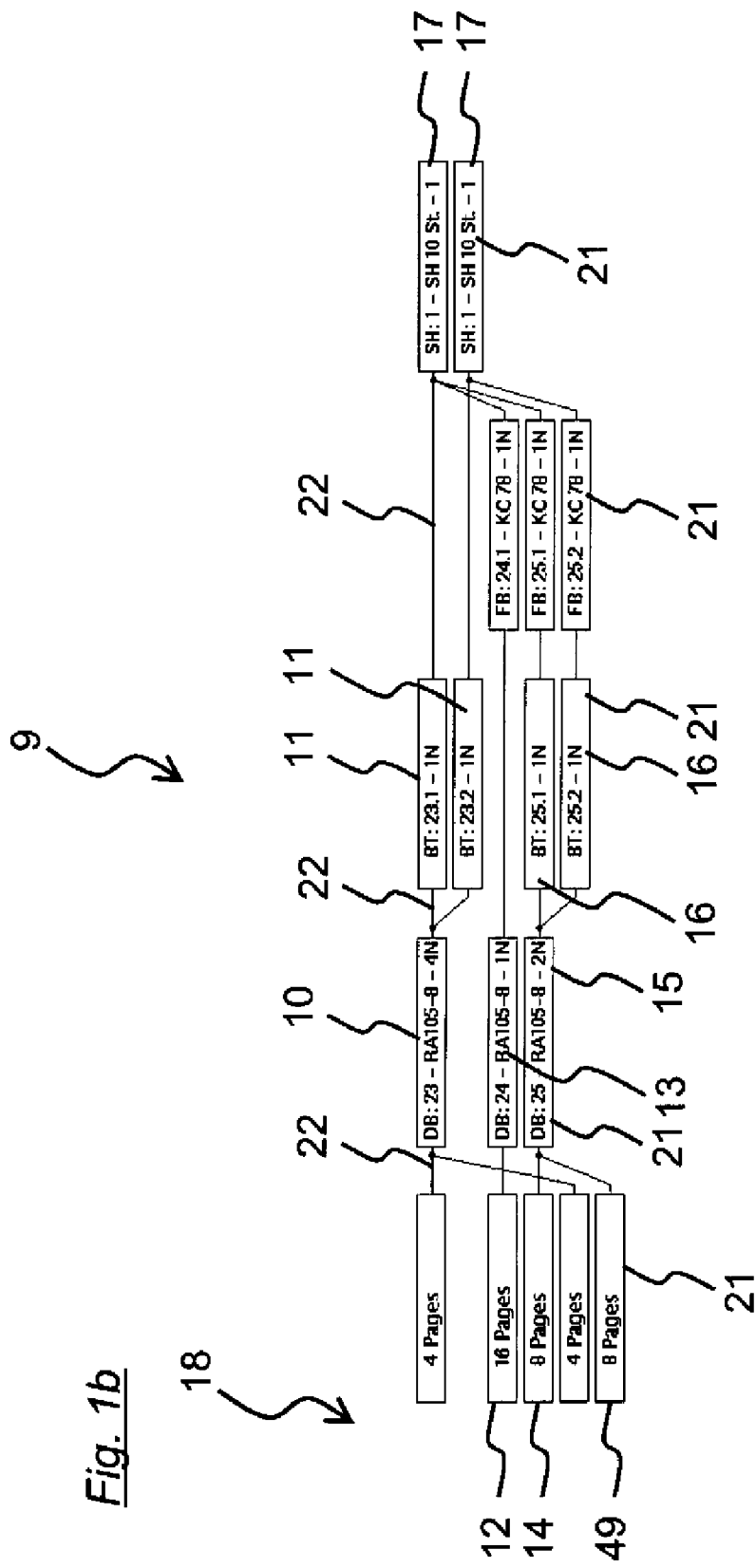
Figure 2A:
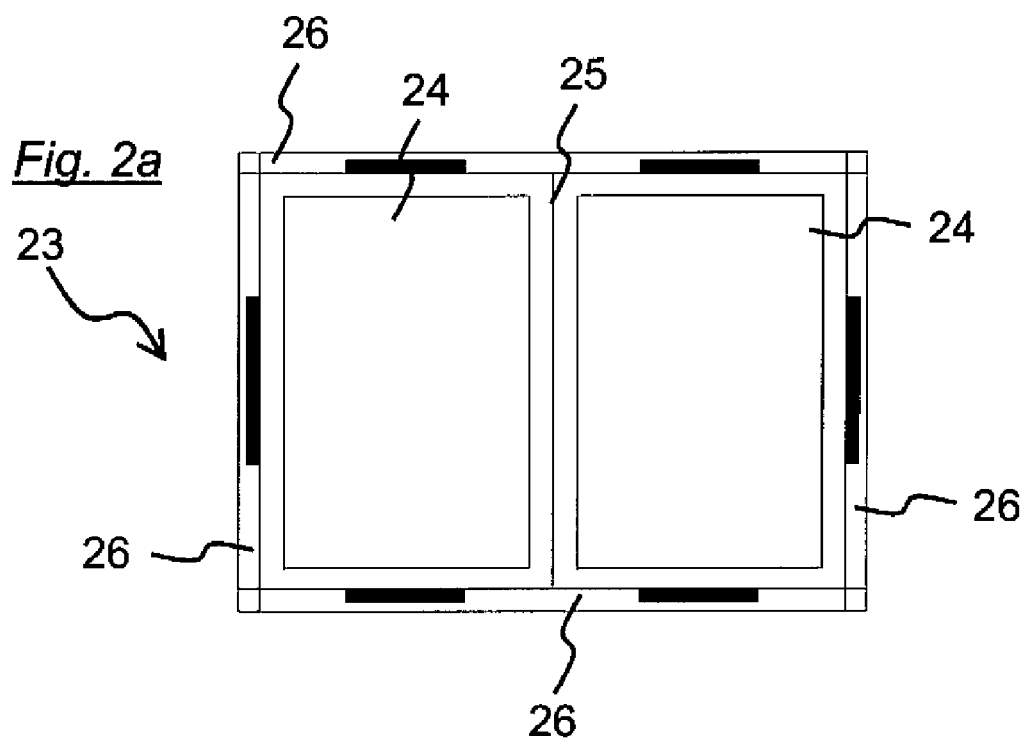
Figure 2B:
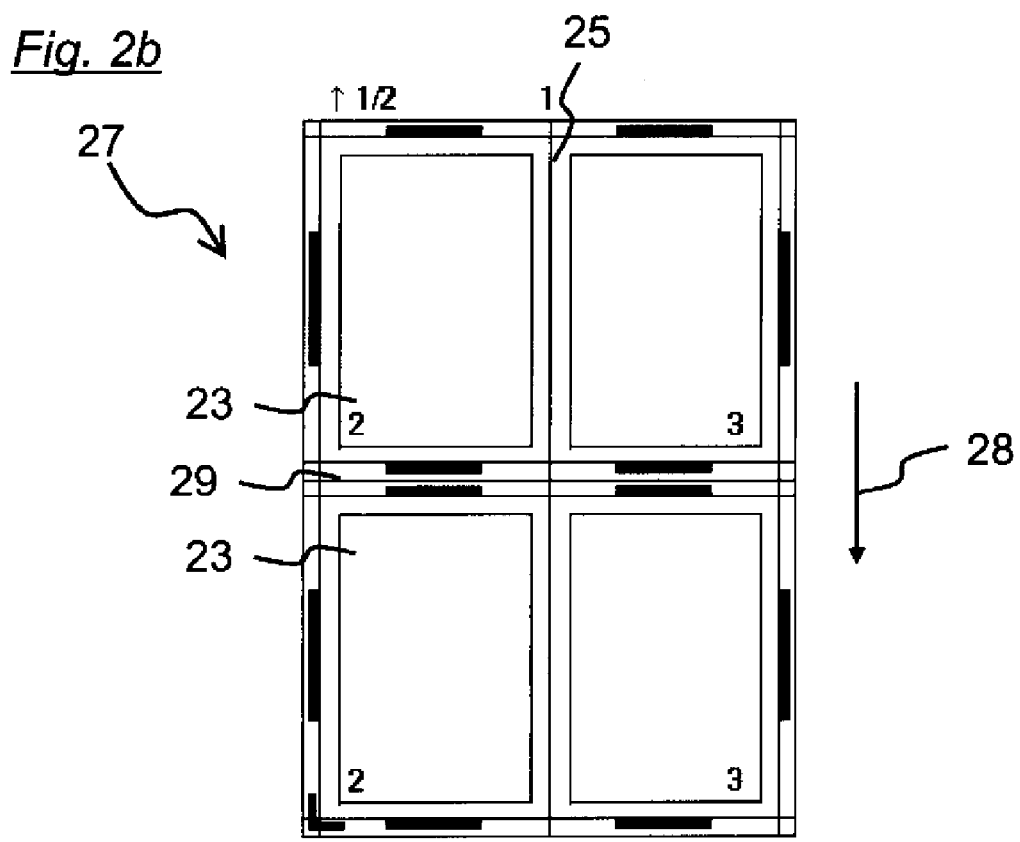
Figure 3A:
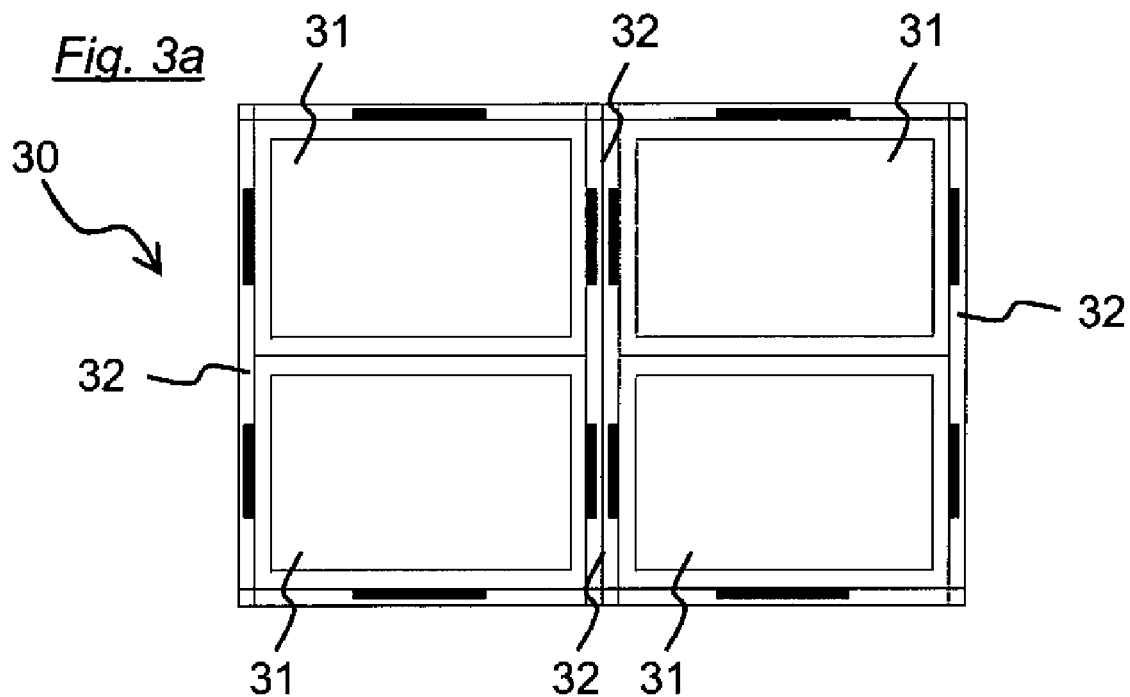
Figure 3B:
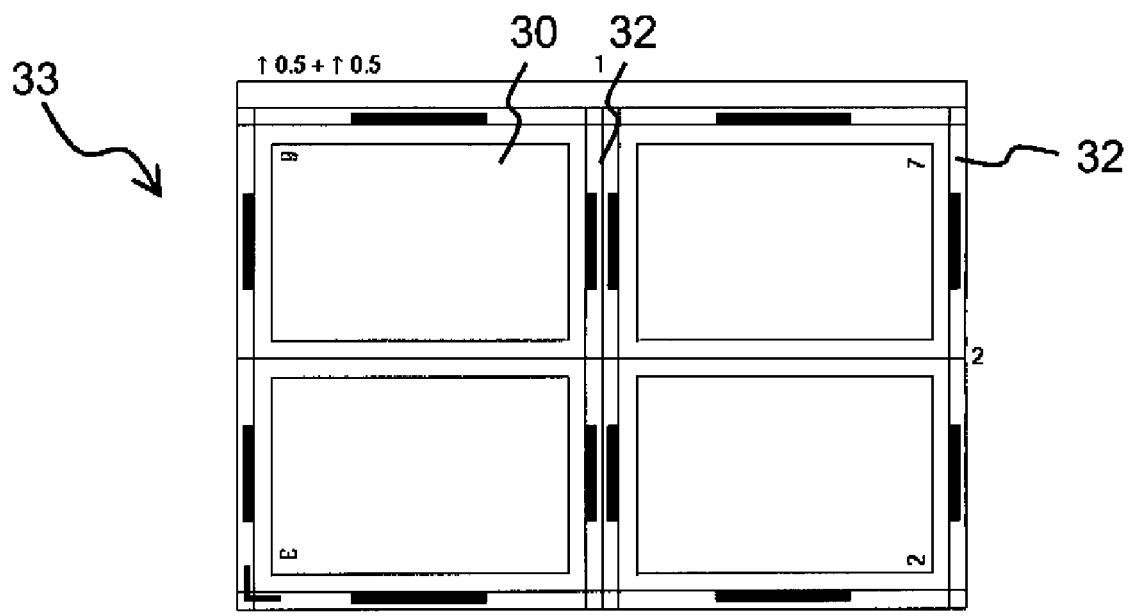
Figure 4:
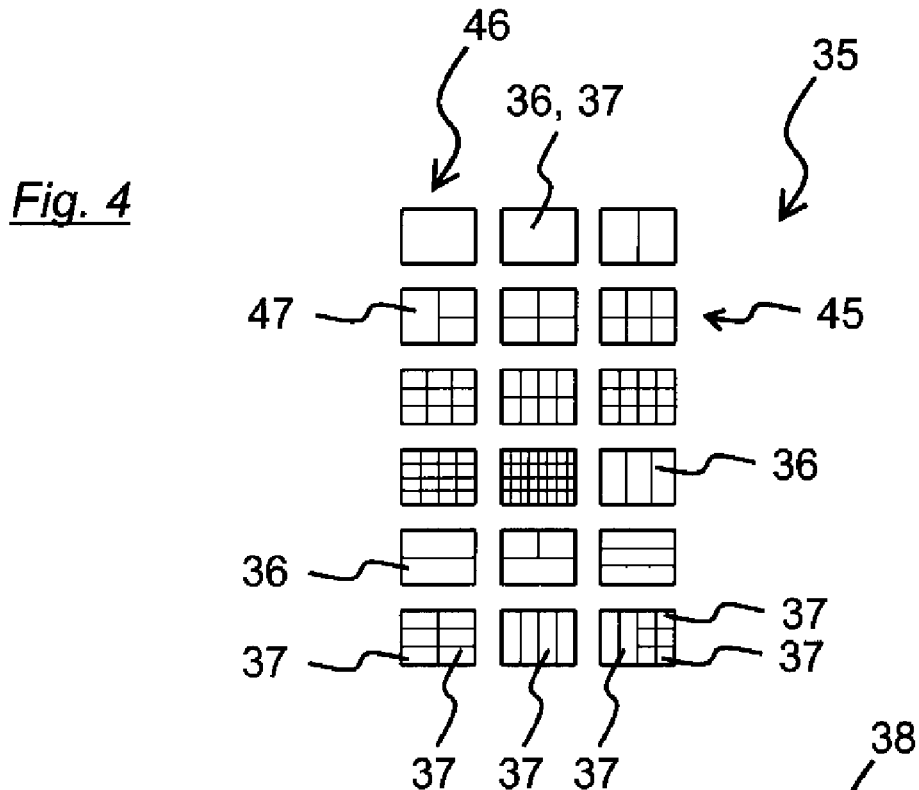
Figure 5:
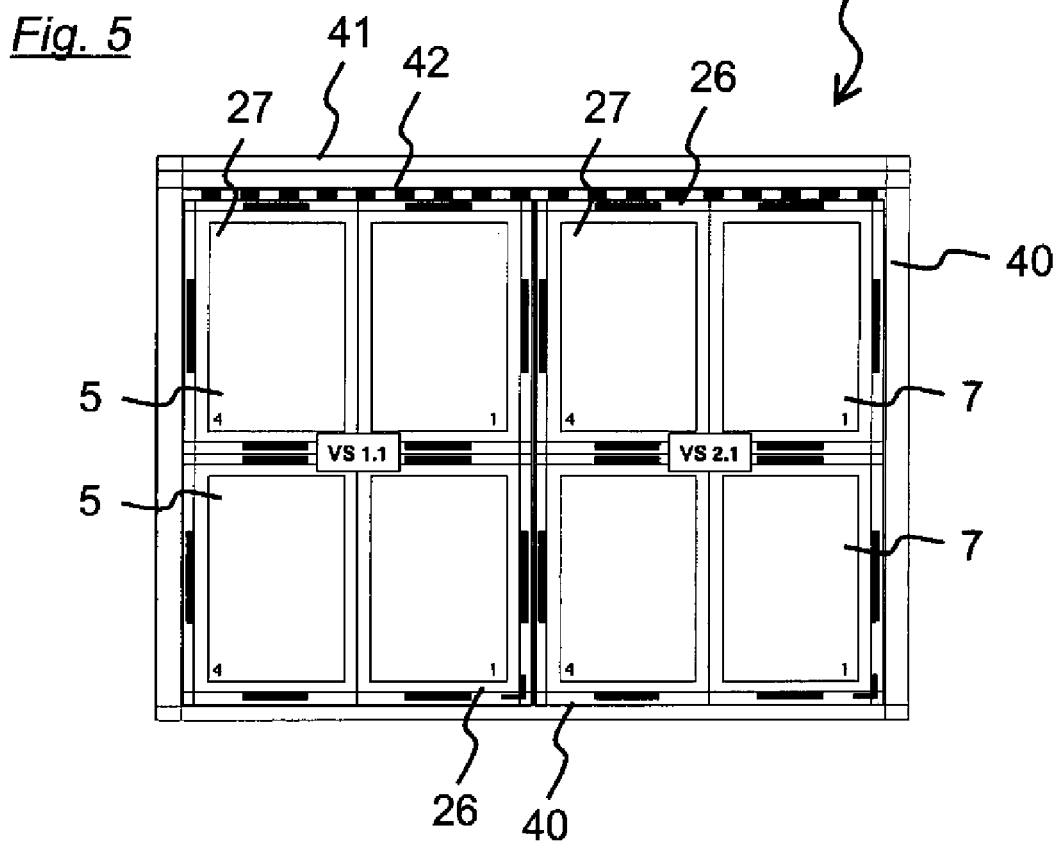
Figure 6A:
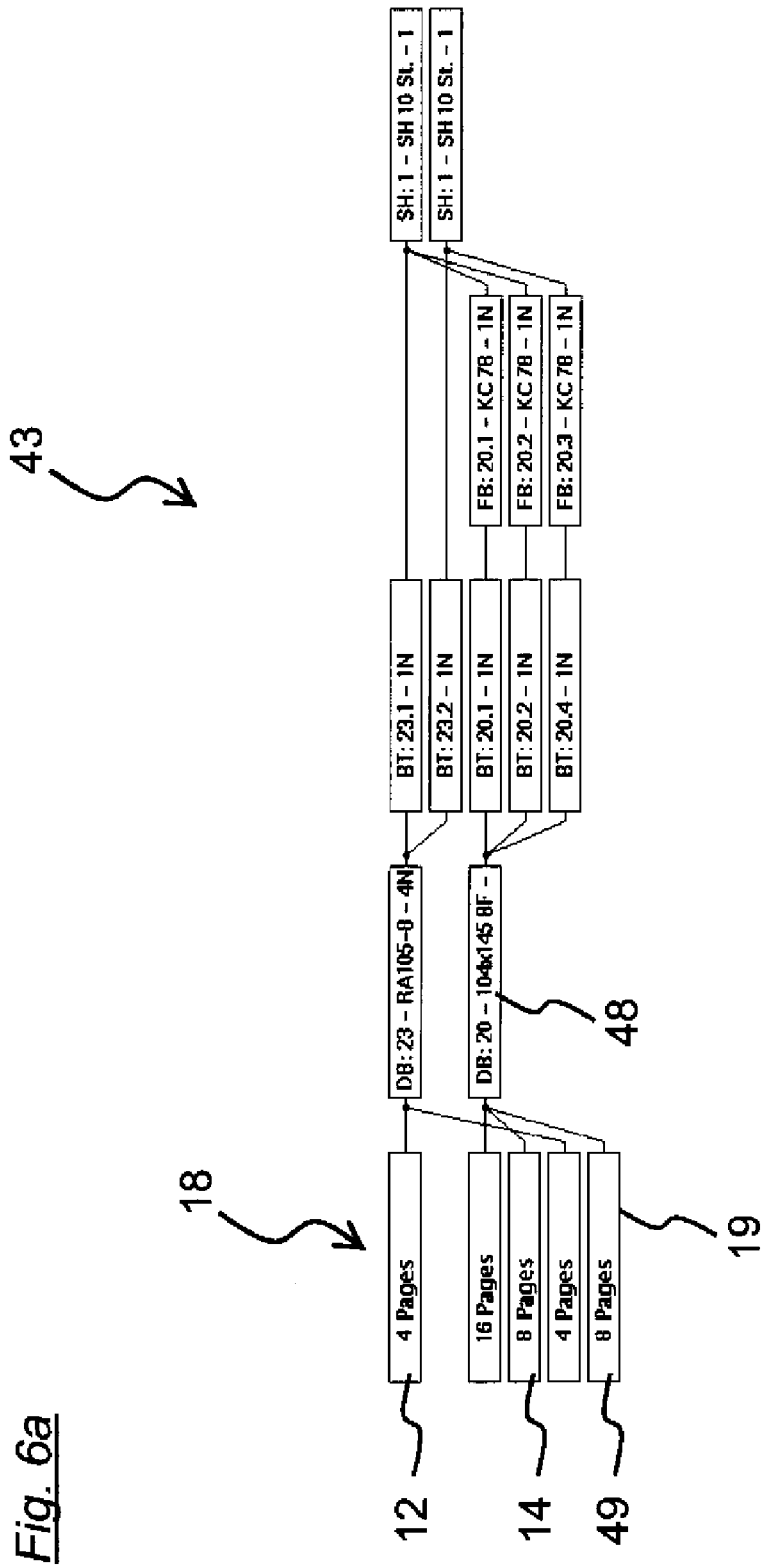

The invention is subsequently described with reference to an embodiment. It is shown in:
FIG. 1a a product structure;
FIG. 1b a first manufacturing process;
FIG. 2a a first partition;
FIG. 2b a first fold sheet;
FIG. 3a a second partition;
FIG. 3b a second fold sheet;
FIG. 4 a selection of print sheet layouts;
FIG. 5 a first imposition scheme;
FIG. 6a a second manufacturing process; and
FIG. 6b a second imposition scheme.

In accordance with the invention, the first part of the product structure 1 shown in FIG. 1a is branched like a tree, from a job 2 "print products" into two print products 3, 4, for use by different recipient groups. The print product 3 "brochure German" comprises a 4-page product component 5 "wrapper", and a 24-page product component 6 "content". The print product 4 "brochure Dutch" also comprises a 4-page product component 7 "wrapper", and an 8-page product component 8 "content".

In costing the job 2 using the MIS, a suggested process 9 for producing the print products 3, 4, is automatically selected by the MIS, which is illustrated in FIG. 1b. The product components 5, 7 "wrapper" of the two print products 3, 4 are printed in two respective portions of a common print sheet 10 that is shown in detail in FIG. 5. The common print sheet 10 is printed four-up and cut in one-up partial sheets 11. A first 16-pager 12 of the product component 6 "content" of the print product 3 "brochure German" is printed one-up on a separate print sheet 13 and then folded. Another 8-pager 14 with the rest of the product component 6 "content" of the print product 3 "brochure German" is printed together with the 8-pager 49 of the product component 8 "content" of the print product 4 "brochure Dutch" on a third print sheet 15. The third print sheet 15 is subsequently cut into two partial sheets 16 that are then folded and collated as a combination folder into raw blocks 17 that are bound together with the partial sheets 11 of the product components 5, 7 "wrapper". The print products 3, 4, are finished by a final cutting in the combination folder into the respective print products 3, 4.

In the job costing proposal, the partial sheets 11 of the product components 5, 7 named "wrapper" and the fold sheets of the product components 6, 8 named "content" in the product structure 1 are units that are not separated from each other during production of the print products 3, 4 before the final cutting of the raw blocks 17. Thus, the product components 5, 7 named "wrapper" and the product components 6, 8 named "content" are partitions 18. They are shown as components of the print products 3, 4 in FIG. 1a. However, in the process 9 shown in FIG. 1b, they are shown as components of the print sheets 13 15. The product structure 1 of FIG. 1a and the process 9 of FIG. 1b are shown consecutively, with direct transition, on the graphic user interface (not shown) as a "network plan type" visualization.

The product structure 1 shown in FIG. 1a branches out like a tree. The structural nodes 19 in that tree that represent the job 2, the print products 3, 4, the product components 5, 6, 7, 8 have "1-n"links, that is to say, they have at the most one incoming link, but have any number of, outgoing links 20, or no outgoing links, to another structural node 19. The process 9 shown in FIG. 1b, on the other hand, is a cross-linked that flows from the partitions 18 that are the "sources" to the raw blocks 17 as that are "sinks", and the process nodes 21 therein have "n-m"-links. Thus, the process nodes can have an independent number of ingoing and outgoing links 22, or no links.

FIG. 2a shows a partition 23 comprising two pages 24 that are to be imprinted on both sides respectively, a binding space 25 disposed there between, and a circumferential cut 26 on all sides. This partition 23 represents the product component 7 "wrapper" of the print product 4 "brochure Dutch". FIG. 2b shows a partial sheet 27 having two partitions 23. The two partitions 23 are arranged in the same orientation behind each other on the partial sheet 27 in the running direction 28, and they are initially cut along the separation line 29 between them and folded into the combination folder along the binding space 25 on a folding machine.

FIG. 3a shows a second partition 30 having four pages 31 that are to be imprinted on both sides respectively, each having a circumferential cut 32. This second partition 30 represents the product component 8 "content" of the print product 4 "brochure Dutch". FIG. 3b shows a fold sheet 33 having a cross fold and also a partition 30 such as the one shown in FIG. 3a. The fold sheet 33 comprises an over fold 34 in addition to the circumferential cut already included in the partition 30.

FIG. 4 shows a selection 35 of predefined print sheet layouts 36, which is stored in the MIS. The print sheet layouts 36 each comprise a rectangular shape and they are divided into fields 37. In order to generate the imposing scheme 38, shown in detail in FIG. 5, two partial sheets 27 according to FIG. 2b with one respective product component 5, 7 "wrapper" of the two print products 3, 4 are disposed on the first print sheet 10 according to the print sheet layout 39 shown on the top right in the selection 35 according to FIG. 4, wherein said print sheet 10 comprises another circumferential cut 40 besides the cut 26, defined for the partial sheets 27, wherein said cut 40 holds a color calibration stripe 42, disposed among other things along a longitudinal side 41 of the print sheet 10.

FIG. 6a shows a manually generated alternative process 43 for producing the print products 3, 4 according to the proposal, which differs from the proposal automatically generated by the MIS in that all partitions 12, 14, 19 of the product component 6, 8 "content" of the two print products 3, 4 are printed, together on one common print sheet 48 in the imposition scheme 44 shown in FIG. 6b, according to the print sheet layout 47 that is shown in the second line 45, first column 46 of the selection 35 in FIG. 4.

What is claimed is:

1. A method for arranging pages of one or more print products into an imposition scheme, comprising the steps of:
   assigning the pages to partitions of the one or more print products;
   arranging the partitions on fold sheets;
   arranging the fold sheets on print sheets;
   imprinting the print sheets with the pages and cutting the print sheets into the fold sheets;
   folding and cutting the fold sheets and collating the fold sheets into the raw block of the one or more print products; and
   applying a cut to the raw block,
   wherein the partitions are units of at least two connected pages of one respective print product,
   wherein at least one of the partitions is a unit of more than two connected pages,
   wherein the pages included in a partition are at the most separated from each other by the cut of the raw block of the one or more print products after the one or more print products are collated into the raw block, and
   wherein at least one fold sheet includes at least two partitions.

2. The method of claim 1 further comprising the step of:
   selecting a cost optimized arrangement from various possible arrangements of the partitions on the fold sheets and of the fold sheets on the print sheets.

3. The method of claim 2, wherein the selecting step selects an arrangement that minimizes waste.

4. The method of claim 2, wherein the selecting step selects, an arrangement that reaches predetermined quality requirements.

5. The method of claim 2, further comprising the step of:
   determining the possible arrangements of the partitions on fold sheets and the arrangement of fold sheets on print sheets using a plurality of sheet sizes.

6. The method of claim 1, wherein the pages are, arranged on print sheets using a plurality of layouts.

7. The method of claim 1, wherein partitions are arranged on fold sheets independent of the respective print products.

8. The method to claim 1, wherein fold sheets are arranged on print sheets independent of the respective print products.

9. A method for arranging pages of plural print products into an imposition scheme, comprising the steps of:
   assigning the pages to partitions of the plural print products;
   arranging the partitions on fold sheets;
   arranging the fold sheets on print sheets;
   imprinting the print sheets with the pages and cutting the print sheets into the fold sheets;
   folding and cutting the fold sheets and collating the fold sheets into the raw block of the plural print products; and
   applying a cut to the raw block,
   wherein the partitions are units of at least two connected pages of one respective print product,
   wherein at least one of the partitions is a unit of more than two connected pages,
   wherein the pages included in a partition are at the most separated from each other by the cut of the raw block of the plural print products after the plural print products are collated into the raw block, and
   wherein at least one fold sheet includes at least two partitions.

10. The method of claim 9 further comprising the step of:
    selecting a cost optimized arrangement from various possible arrangements of the partitions on the fold sheets and of the fold sheets on the print sheets.

11. The method of claim 10, wherein the selecting step selects an arrangement that minimizes waste.

12. The method of claim 10, wherein the selecting step selects an arrangement that reaches predetermined quality requirements.

13. The method of claim 10, further comprising the step of:
    determining the possible arrangements of the partitions on fold sheets and the arrangement of fold sheets on print sheets using a plurality of sheet sizes.

14. The method of claim 9, wherein the pages are arranged on print sheets using a plurality of layouts.

15. The method of claim 9, wherein partitions are arranged on fold sheets independent of the respective print products.

16. The method to claim 9, wherein fold sheets are arranged on print sheets independent of the respective print products.

* * * * *